May 31, 1966  R. KOBLER ET AL  3,253,352
EXPANDABLE KEYBOARD
Filed Aug. 31, 1965  2 Sheets-Sheet 1

INVENTORS
RICHARD KOBLER
STANLEY K. HUNT

By *George H. Fritzinger*
AGENT

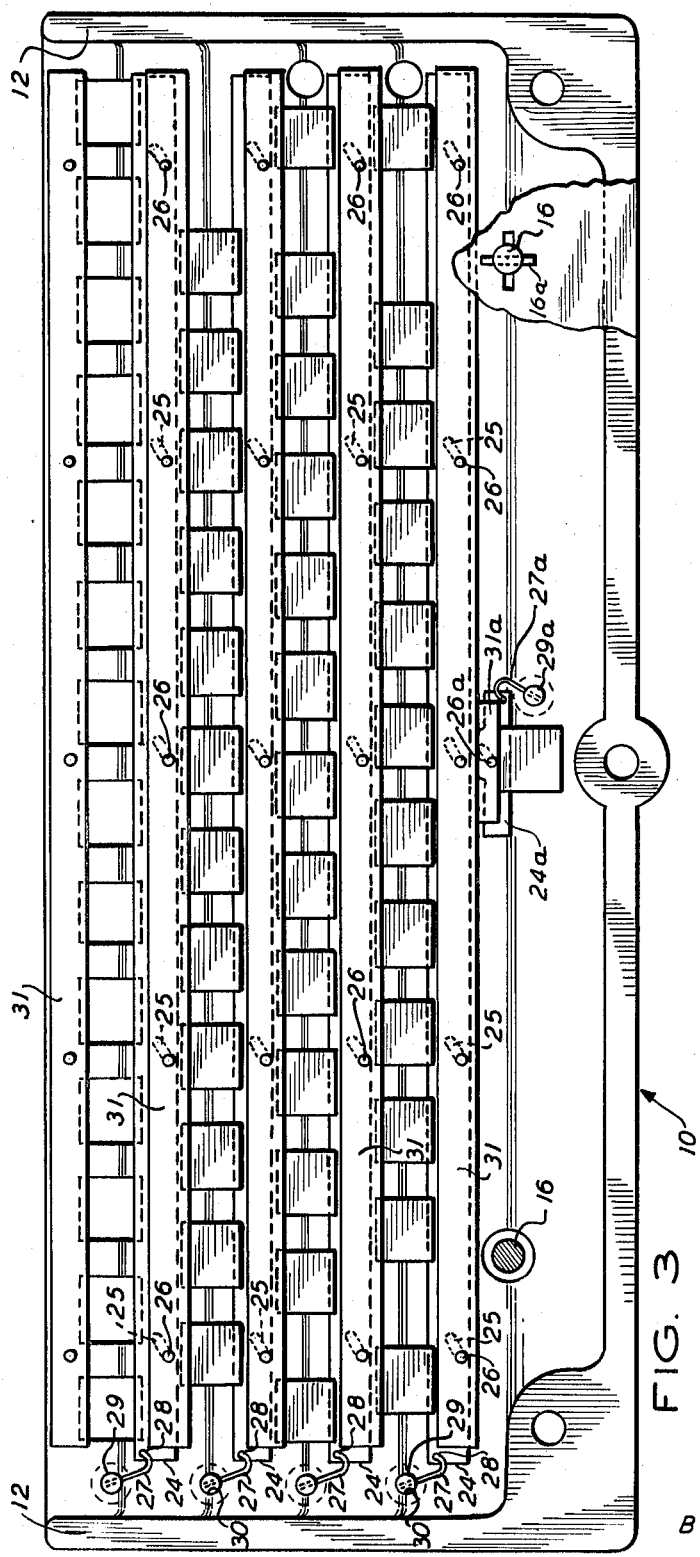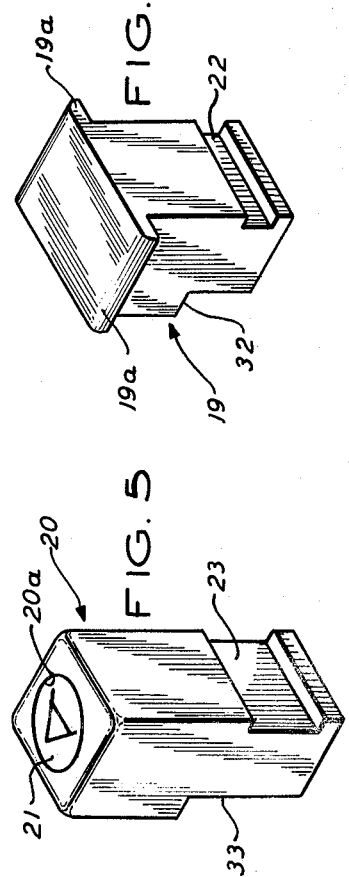

3,253,352
EXPANDABLE KEYBOARD
Richard Kobler, West Orange, N.J., and Stanley K. Hunt, Lynbrook, N.Y., assignors to McGraw-Edison Company, Elgin, Ill., a corporation of Delaware
Filed Aug. 31, 1965, Ser. No. 483,932
7 Claims. (Cl. 35—5)

This invention relates to a cover or masking device for the keyboard of a typewriter, which is arranged so that it can be preset to permit selected keys of the typewriter to be operated and to block access to all of the remaining keys. Although the invention is herein described specifically in connection with a typewriter keyboard it will be understood that the invention can be used with any keyboard such as of a computer or punchcard setup device, for simplifying a coding input in producing standard invoices, tickets, etc.

An object of the invention is to provide a device for educational apparatus using typewriters, which enables an instructor to limit the number of keys made available to the pupil and which permits the number of keys available to the pupil to be increased by stages as the pupil advances in his learning process.

The invention is particularly useful in teaching techniques and educational apparatus wherein a typewriter is coupled to audio equipment for pronouncing and/or making statements relating to the characters on the respective keys as the characters are typed. Such educational apparatus may also include an exhibitor or projector for displaying characters, pictures, words or sentences before or after the pupil has typed related characters, or combinations thereof, such as is disclosed in the pending Kobler et al. application Serial No. 185,616 filed April 6, 1962. However, no unnecessary limitation of the invention to such educational equipment is intended.

It is now believed that to expose a pupil at the outset to all of the characters—i.e., the lower and upper case letters, numbers, signs and symbols—which appear on the keys of a typewriter leads to confusion which impedes the progress of the pupil in the beginning stages. For instance, on a keyboard there are the alphabetical characters which with the shift keys represent both upper case letters and hidden lower case letters, and there are the numbers, syntactical signs including space, period, comma, question mark, exclamation mark, colon and semicolon, and in addition there are miscellaneous symbols such as dollar sign, quote, star, ampersand, etc. To children who have not yet learned to recognize and pronounce any of these characters, a presentation of the whole keyboard at one time can retard the early progress of the pupil. The presentation even of the entire group of alphabetical letters is itself too much for a beginner to grasp. Rather, the child will learn faster if at first only a few simple letters are made available which he can at first learn to recognize and pronounce and then compose into short sentences expressing simple thoughts. Once such small group of letters is mastered a larger and more complex group of characters can be presented. In this way through careful programming of the letter combinations made available to the pupil the pupil will learn more quickly by progressive stages without confusion. The present invention is adapted to enable such expanding teaching program to be easily carried out.

Further objects of the invention are to provide an expandable keyboard which can be easily preset by an instructor to make available only selected keys to a pupil, and which is of a simple and economical construction.

In the description of the invention, reference is had to the accompanying drawings, of which:

FIGURE 3 is a bottom view of the expandable keyboard taken on the line 3—3 of FIGURE 1; and FIGURES 4 and 5 are isometric views respectively of the filler plugs and push buttons which are insertable in the expandable keyboard.

Figure 1:
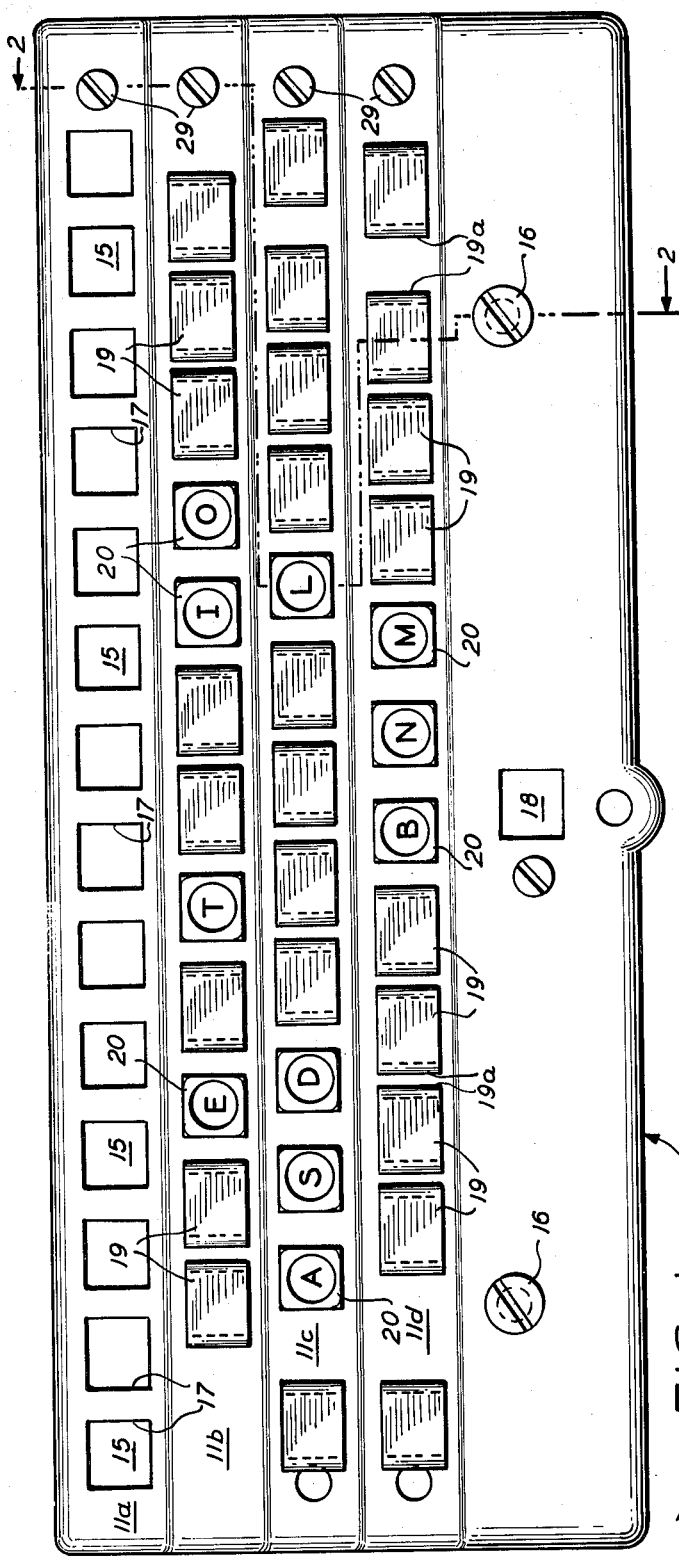
FIGURE 1 is a top view of an expandable keyboard according to the invention, showing the second, third and fourth rows of keyholes filled with filler plugs and push buttons according to an illustrative example but showing the keyholes open in the first row only to better illustrate the construction of the device.
Figure 2:
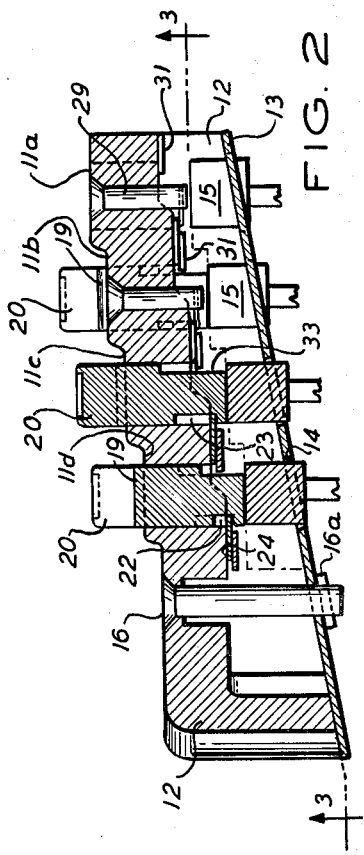
FIGURE 2 is a cross sectional view taken on the line 2—2 of FIGURE 1.

The expandable keyboard comprises a rectangular matrix or frame 10 preferably die cast as of aluminum. The frame has a top face which is terraced in four stages proceeding from the back to the front to provide key-row areas 11a to 11d successively at lower levels in accordance with the levels of the successive rows of keys of a standard keyboard. The frame 10 has a depending rim flange 12 along its sides and front which is of an increasing height proceeding from back to front as shown in FIGURE 2. As an example of mounting, a flat rectangular plate 13 having clearance holes 14 for the respective keys 15 of the keyboard of a typewriter (FIGURE 2) is first placed downwardly past the keys onto the side frame structure of the typewriter and secured thereto. The frame 10 is then mounted on the plate 13 with the flange 12 seating thereon, and is secured thereto by two locking screws 16 of a bayonet type which traverse respective rectangular holes in the plate 13. For instance, the locking screws 16 may have spring-type cross arms 16a on their lower end portions which are inserted through rectangular holes in the plate 13 and then turned through one-quarter revolution to lock the frame 10 to the plate 13.

The frame 10 has four rows of keyholes 17 aligned with the respective keys 15 of the keyboard, and has an additional front keyhole 18 centered with respect to the space bar (not shown) of the keyboard. Preferably, each of the keyholes is rectangular in shape and made about one-half inch in each of its crosswise dimensions. Inserted selectively into the respective keyholes 17 and 18 are respective filler plugs 19 and push buttons 20 shown respectively in FIGURES 4 and 5.

The filler plugs 19 have top side flanges 19a which seat onto the frame 10. The push buttons 20 have body portions of uniform cross section since they are to be reciprocated in the respective keyholes. In the top face of each push button there is a shallow circular recess 20a into which is inserted a circular piece 21 as of paper or plastic bearing the character or other indicia of the respective key 15 which the push button overlies. These circular pieces may be held in place as by press fit or by pressure-sensitive adhesive.

The lower portion of the respective filler plugs 19 and push buttons 20 project below the frame 10 and are provided with cross slots 22 and 23. All of the plugs and buttons are properly oriented so that these cross slots face to the front of the machine. Along the front of each row of filler plugs and push buttons is a locking bar 24 mounted slidably on the bottom face of the frame 10. These locking bars have slots 25 inclined relative to the lengthwise dimensions of the bars, which are traversed by headed studs 26 that are threaded into the frame 10. When a force is exerted lengthwise of a locking bar in a rightward direction as it appears in FIGURE 3 the bar is cammed towards the adjacent row of filler plugs and push buttons and moved into engagement with the respective cross slots 22 and 23 to lock the plugs and buttons from being removed from the frame 10. The cross slots 23 in the push buttons are made sufficiently long to allow the push buttons to be depressed to operate the respective keys of the typewriter. When a push button is released from a depressed position it is returned by the upward spring force exerted on the key of the typewriter.

The locking bars 24 are biased over-center by curved wire springs 27 having end portions pivotally engaging corner holes 28 in the locking bars and other end portions anchored into adjusting studs 29 pivoted in respective holes 30 in the frame 10. The studs have slotted heads to permit them to be turned by a suitable screwdriver (not shown). When a stud 29 is turned counterclockwise as it appears in FIGURE 3 the respective locking bar 24 is shifted over center with respect to the respective spring 27 in a rightward direction into locking engagement with the respective row of filler plugs and push buttons. When the stud is turned clockwise the respective bar is shifted to the left and out of engagement with the respective row of plugs and buttons to permit any or all of the filler plugs to be replaced by push buttons, or vice versa. After such replacement is made according to any desired arrangement the locking bars are shifted back into locking engagement with the plugs and buttons.

Overlying each of the locking bars 24 is a retainer bar 31 which also serves as a key orientation bar, as will appear. For orientation purposes, there is also another orientation bar 31 at the back side of the rearmost row of keyholes 17. These retention and orientation bars are held in place by the studs 26.

Each orientation bar underlies a rearward portion of each keyhole 17 in the row directly ahead of the bar. Also, the filler plugs 19 and push buttons 20 have respective recesses 32 and 33 in their lower rearward portions opposite the cross slots 22 and 23 respectively. These recesses run out the lower ends of the plugs and buttons so that the plugs and buttons can be inserted in the respective keyholes 17 when the plugs and buttons are properly oriented to bring the back recesses 32 and 33 thereof in alignment with the orientation bars. Such orientation of the plugs and buttons is necessary so that any indicia on the plugs and buttons will face to the front and so that the cross slots 22 and 23 will face toward the locking bars 24. Again, the recesses 33 in the push buttons are made especially long to permit the buttons to be depressed to operate the respective keys of the typewriter.

Also, as shown in FIGURE 3, the filler plug or button aligned with the space bar has a short locking bar 24a associated therewith which is overlaid by a short retainer bar 31a held in place by a stud 26a. Again, the locking bar has an inclined slot so that it can be cammed into and out of locking engagement with the respective plug or button. An adjacent adjusting stud 29a is coupled by an over center spring 27a to the locking bar 24a in the manner before-described, so that the locking bar can be shifted over center between locking and non-locking positions.

The embodiment of my invention herein particularly shown and described is intended to be illustrative and not necessarily limitative of my invention since the same is subject to changes and modifications without departure from the scope of my invention, which I endeavor to express according to the following claims.

We claim:

1. A key selector device for the keyboard of a typewriter including a cover plate, means for mounting said plate in a position overlying said keyboard, said plate having individual holes aligned with the respective keys of the typewriter, removable filler plugs mounted in selected ones of said holes for concealing respective keys not to be operated, and manually operable push buttons mounted in the remaining ones of said holes for operating selectively the remaining keys of said keyboard.

2. The key selector device set forth in claim 1 wherein said filler plugs are adapted to seat on the top face of said cover plate and wherein said manually operable push buttons extend substantially upwardly from said cover plate to a height substantially above said plugs.

3. The key selector device set forth in claim 1 including a shiftable locking means on said plate cooperable with said filler plugs to secure the same in fixed positions in said plate and cooperable with said pushbuttons to secure the same against removal from said plate while permitting a predetermined depression of the respective push buttons, said push buttons resting on the respective keys of said keyboard and being normally held in raised positions by said keys, and said push buttons having recesses in their top faces receiving indicia-bearing members designating the respective keys of said keyboard.

4. A key selector device for the keyboard of a typewriter including a cover plate, means for mounting said plate in a predetermined overlying said keyboard, said plate having rows of individual holes in registration with the respective keys of said keyboard, removable filler plugs in selected ones of said holes for rendering inaccessible selected keys not to be operated, push buttons reciprocable in the remaining ones of said holes for operating selectively the respective remaining keys, each of said filler plugs and push buttons having cross slots in a lower sidewall portion which is at a predetermined side of the respective row, locking bars on said plate extending along said rows at said slotted sides, and means mounting each locking bar for sidewise movement into engagement with the slots in the respective row of said keys whereby each bar is effective to lock a row of said filler plugs and push buttons against removal from said plate, the respective slots in said push buttons being elongated to permit lengthwise reciprocable movement of the push buttons to operate the respective keys of the typewriter.

5. The key selector device set forth in claim 4 wherein said locking bars have oblique slots at intervals therealong, including mounting studs on said plate traversing said slots whereby a force exerted in forward and reverse directions lengthwise of said bars will cause the bars to move obliquely sidewise into and out of engagement with said slots, and means coupled to said locking bars for releasably retaining the respective bars in their respective locking and unlocking positions.

6. The key selector device set forth in claim 4 wherein each of said holes is rectangular in cross section and each of said filler plugs and push buttons has a body portion rectangular in cross section to fit the respective holes, said filler plugs and push buttons being of lengths to extend below the cover plate when the plugs and buttons are in mounted positions, each of said filler plugs and push buttons having a locating recess in a lower sidewall portion running through the lower end of the plug or button, said recesses being in a predetermined side of the respective row of filler plugs and push buttons when the plugs and buttons are properly oriented in said holes, and a locating bar for each row fixedly secured to the under side of said cover plate in a position wherein the locating bar traverses a portion of the holes at said predetermined side of the respective row for partially closing the holes to permit the respective plugs and buttons to be inserted only when said locating recesses are aligned with the respective locating bar.

7. The key selector device set forth in claim 6 wherein a locating bar is mounted in overlying relation to a respective locking bar between each pair of adjacent rows of holes in said cover plate, with the locating bar cooperating with the row of plugs and buttons in front thereof and the locking bar cooperating with the row of plugs and buttons in back thereof.

References Cited by the Examiner

UNITED STATES PATENTS

| | | | |
|---|---|---|---|
| 1,078,537 | 11/1913 | Corcoran | 197—1uͻ |
| 1,560,020 | 11/1925 | Curley | 35—5 |
| 2,109,442 | 2/1938 | Brownjohn | 35—5 |
| 2,141,747 | 12/1938 | Gross | 35—5 |
| 2,996,942 | 8/1961 | Jewett | 84—446 |
| 3,080,661 | 3/1963 | Conrath | 35—6 |
| 3,161,967 | 12/1964 | Siegel et al. | 35—5 |

FOREIGN PATENTS 799,430   8/1958   British.

EUGENE R. CAPOZIO, *Primary Examiner.*